United States Patent
Solomakha et al.

(10) Patent No.: US 10,122,646 B2
(45) Date of Patent: Nov. 6, 2018

(54) RESOURCE PLACEMENT VIA A WEB PAGE

(71) Applicant: AOL INC., Dulles, VA (US)

(72) Inventors: Dmytro Solomakha, Jersey City, NJ (US); Geetu Ambwani, New York, NY (US)

(73) Assignee: OATH INC., Dulles, VA (US)

( * ) Notice: Subject to any disclaimer, the term of this patent is extended or adjusted under 35 U.S.C. 154(b) by 203 days.

(21) Appl. No.: 14/935,173

(22) Filed: Nov. 6, 2015

(65) Prior Publication Data
US 2017/0134300 A1 May 11, 2017

(51) Int. Cl.
*G06F 15/173* (2006.01)
*H04L 12/911* (2013.01)
*H04L 29/08* (2006.01)
*G06F 17/30* (2006.01)

(52) U.S. Cl.
CPC .............. *H04L 47/70* (2013.01); *H04L 67/02* (2013.01); *G06F 17/30867* (2013.01)

(58) Field of Classification Search
CPC .... H04L 47/70; H04L 67/02; G06F 17/30867
USPC ....................................................... 709/226
See application file for complete search history.

(56) References Cited

U.S. PATENT DOCUMENTS

| | | | | |
|---|---|---|---|---|
| 6,385,641 B1* | 5/2002 | Jiang | ........................ | H04L 29/06 709/203 |
| 7,660,815 B1* | 2/2010 | Scofield | ............ | G06F 17/30702 707/999.102 |
| 8,655,819 B1* | 2/2014 | Burkard | ............... | G06N 99/005 706/45 |
| 2004/0098486 A1* | 5/2004 | Gu | .................... | G06F 17/30902 709/228 |
| 2006/0010229 A1* | 1/2006 | Chen | ....................... | G06F 17/18 709/219 |
| 2006/0075068 A1* | 4/2006 | Kasriel | ............. | G06F 17/30902 709/217 |
| 2011/0145287 A1* | 6/2011 | Jiang | ................. | G06F 17/30905 707/780 |
| 2011/0246406 A1* | 10/2011 | Lahav | .................... | G06Q 30/02 706/46 |
| 2011/0313548 A1* | 12/2011 | Taylor | ............... | G06F 17/30867 700/47 |
| 2012/0137201 A1* | 5/2012 | White | ............... | G06F 17/30899 715/205 |

(Continued)

*Primary Examiner* — James E Springer
(74) *Attorney, Agent, or Firm* — Shook, Hardy & Bacon, L.L.P.

(57) ABSTRACT

In various embodiments, methods and systems make a type of resource available via a target web page, based on the presence of resources of the same type being available on other pages visited by the traffic accessing the target web page. One or more resource history values are determined for a set of traffic flows in at least a portion of the traffic that accesses the target web page. Each traffic flow extends between the target web page and a respective web page with a resource profile for the specified type of resource. The resource profiles can be used to determine resource history values for the traffic flows. The target web page's resource profile for the specified type of resource can be established based on the resource history values. Based on the target web page's resource profile for the specified resource type, a resource of the specified type can be designated to be available on the target web page.

20 Claims, 3 Drawing Sheets

(56) References Cited

U.S. PATENT DOCUMENTS

| | | | |
|---|---|---|---|
| 2013/0073609 A1* | 3/2013 | Connolly | G06F 15/16 709/203 |
| 2015/0088911 A1* | 3/2015 | Qiao | G06F 17/30867 707/749 |
| 2015/0169693 A1* | 6/2015 | Stekkelpak | G06F 17/30864 707/748 |
| 2015/0200994 A1* | 7/2015 | Jain | H04L 67/02 709/219 |
| 2015/0371142 A1* | 12/2015 | Jain | G06F 17/30902 706/52 |
| 2016/0226969 A1* | 8/2016 | Holland | H04L 67/1076 |
| 2016/0247165 A1* | 8/2016 | Ryabchun | G06Q 30/016 |
| 2016/0330269 A1* | 11/2016 | Alstad | H04L 67/06 |

\* cited by examiner

RESOURCE PLACEMENT VIA A WEB PAGE

BACKGROUND

People access resources they need in their professional and personal endeavors through web pages on the Internet and private computer networks. For example, a person may access a web page that hosts an interface to their email or bank. Web page operators often desire to provide resources on their page that align with the interests of people arriving at the page. For instance, the operator of a web page may provide access to a person's email service. If the operator believes that people arriving at the page to use their email may have an interest in using a word processing application, the operator may enable the page to provide visitors with access to resources for creating and editing documents. However, with all of the people using the Internet and private computer networks, a web page can experience a very large volume of traffic from visitors and it can be a challenge for the page operator to know what resources to make available. Merely providing resources based on the existing content on a page, as described in the above example, may miss opportunities to provide unrelated content that also interests visitors to the web page.

People's desire to maintain the security of personal information in the online era also presents a challenge. People may prefer not to have their preferences for content associated and stored with their personal identity in network accessible locations that could be breached by malicious or inadvertent actions. This sentiment disfavors a web page operator simply collecting and maintaining personal identity information and content preferences about each page visitor and then supplying page content based on the stored identity and preferences when the visitor returns to the page.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Web page visitors, which make up the body of traffic that accesses a web page, typically visit other web pages before and after visiting the current page. The resources available on pages visited by a person reflect potential resources that person may be interested in having available on a web page. A web page operator can utilize resource information about the prior and subsequent pages visited by the aggregate traffic on the operator's page to determine the types of resources that may interest visitors to the operator's page. The operator can maintain resource information about the pages visited by traffic accessing his page without storing any association between the identity of a specific visitor to his page and other pages the visitor traversed.

If the page operator determines there are sufficient instances of other pages with a type of resource being accessed by the traffic on his page, the operator may designate a resource of the same type to be available via his web page. In one example, a portion of the traffic accessing the operator's page also accesses pages with a search engine resource, so the operator makes a search engine resource available via his page. This approach to providing resources avoids the need to rely on the content already on the web page to determine which resources to make available. Instead, it captures the actual aggregate interest of the traffic that accesses the web page, providing unique context from the page's visitors. This allows the page content to be adjusted in real time based on the drift in interests reflected by the actual traffic patterns of web page visitors.

Although the above summary makes reference to a web page operator making determinations about the resources provided on a web page, there's no requirement that the web page operator carry out this operation or any other. Any entity responsible for providing resources on a web page can perform, or enlist others to perform, operations that lead to identifying and providing resources for the web page.

BRIEF DESCRIPTION OF THE DRAWINGS

The present invention is described in detail below with reference to the attached drawing figures, wherein.

DETAILED DESCRIPTION

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Exemplary embodiments provide methods and systems to make a type of resource available via a target web page based on the presence of resources of a specified type being available on other pages visited by the traffic accessing the target web page. A resource can refer to anything that can be identified, named, addressed, accessed, or handled from a computing system. A resource can be any type of addressable object, such as, services, documents, files, advertisements, applications, scripts, or other web resources.

Figure 1:
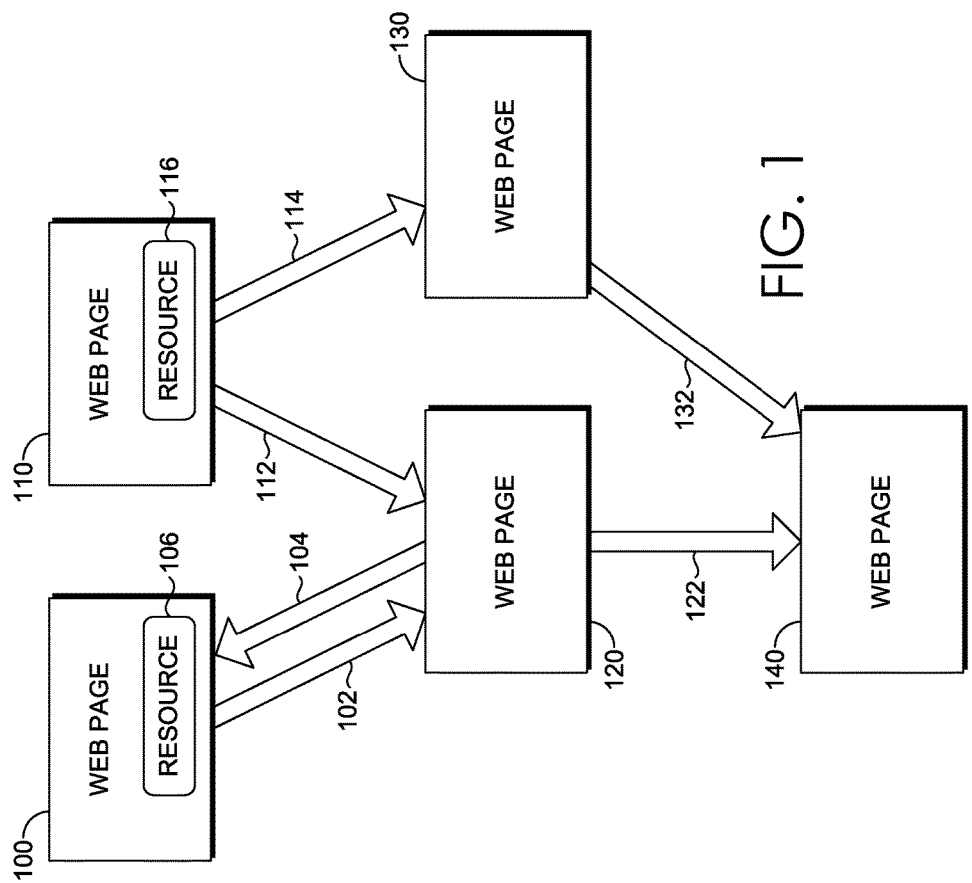
FIG. 1 is an exemplary set of web pages on a computer network, as well as traffic flows and resources associated with the web pages.

FIG. 1 shows an exemplary set of web pages on a computer network, as well as traffic flows and resources associated with certain web pages. Web pages 100, 110, 120, 130, and 140 reside within one or more computer networks, such as the Internet and computer network 440 described below with reference to FIG. 4. People can use the computer network to navigate between web pages 100, 110, 120, 130, 140, and other web pages. In one embodiment, a web page is any addressable location on a network, such as the Internet or a private computer network, where resources and other content can be made accessible. This includes a web page rendering web documents and other material in languages such as Hypertext Markup Language ("HTML"). Embodiments may include static web pages, dynamic web pages, or a combination of both. A web page is typically accessed using a communications protocol, such as Hypertext Transfer Protocol ("HTTP"), that allows resources to be accessed via the web page. In one alternate embodiment, web pages are hosted within a computing system, as disclosed in FIG. 3.

In one instance, a web page provides entities that navigate to the web page with access to one or more resources via the web page. One example resource is static content, such as a news article for an online publication that is hosted on a web site that includes a number of other web pages. The article or other content on the web page may include resources in the form of a link, such as a URL, that provides entities with the ability to navigate to another location that hosts content or a service.

Entities that navigate to web page 100 can access resource 106 via web page 100. One example of resource 106 is a service, such as email or a search engine, that is controlled by script within web page 100 or a remote server. In another instance, resource 106 is an advertisement. Resource 106 can be a banner advertisement that is displayed on web page 100 or a click through advertisement that includes a link, such as a URL, that can be used to navigate to another location, such as a web page associated with the subject matter of the advertisement. Entities that navigate to web page 110 can access resource 116 via web page 110. Similar to resource 106, resource 116 can vary across different embodiments.

The traffic flow arrows between web pages represents traffic navigating from one page to the other. The direction of the arrow reflects the direction of the traffic flow. For example, traffic flow 102 represents traffic generated by navigating from web page 100 to web page 120, and traffic flow 104 represents traffic generated by navigating from web page 120 to web page 100. Traffic flow 112 represents traffic generated by navigating from web page 110 to web page 120, and traffic flow 114 represents traffic generated by navigating from web page 110 to web page 130. Traffic flow 122 represents traffic generated by navigating from web page 120 to web page 140, and traffic flow 132 represents traffic generated by navigating from web page 130 to web page 140.

Figure 2:
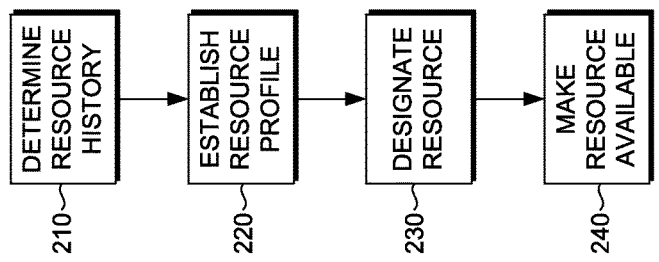
FIG. 2 is a flow diagram showing an exemplary method for providing resources via a web page.

FIG. 2 is a flow diagram showing an exemplary method for providing resources via a target web page. A resource of a specified type is provided via the target web page, based on the likelihood that entities accessing the target web page would potentially desire a resource of the specified type. For example, access to a search engine is provided via the target web page, if it is determined that entities accessing the target web page potentially desire a search engine. In one embodiment, this is based on the resource profiles of web pages accessed by entities that access the target web page, where the resource profiles can be used to determine resource histories of the traffic flows associated with the target web page. The resource profile for a web page reflects a level of likelihood that entities accessing the web page have at some point accessed a web page that makes a resource of the specified type available.

In one embodiment, the specified resource type is the subject matter of a resource, such as healthy eating options. Potential resources include online articles about healthy eating options, advertisements for restaurants with healthy eating options, a service that locates nearby restaurants with healthy eating options, or a web service that enables ordering food from restaurants with healthy eating options. In one example, resource 106 provided via web page 100 and resource 116 provided via web page 110 are resources of the specified type, such as subject matter related to healthy eating options. Each of these web pages has an assigned default resource profile associated with the fact a resource of the specified type can be accessed by entities navigating to web page 100 or 110. In this example, the default resource profile has a value of 100, and the target web page being evaluated for hosting a resource of the specified type is web page 140.

In step 210, resource history is determined for traffic that accesses target web page 140. In one embodiment, a resource history value is determined for each traffic flow between target web page 140 and an adjacent web page. An adjacent web page is a web page that an entity navigates to directly from target web page 140 or navigates from directly to target web page 140. A resource history value is determined for a traffic flow based on the weight of the traffic flow and the resource profile of the adjacent web page for the specified resource type. In one embodiment, the weight of a traffic flow from target web page 140 to an adjacent web page is the percentage of traffic out of target web page 140 that constitutes the the traffic from target web page 140 to the adjacent web page for a specified period of time. In such an embodiment, the weight of a traffic flow from the adjacent web page to target web page 140 is the percentage of traffic out of the adjacent web page that constitutes the traffic from the adjacent web page to target web page 140 for a specified period of time.

In one example, based on FIG. 1, traffic flow 122 from adjacent web page 120 to target web page 140 is 80% of the traffic coming out web page 120, making the weight of traffic flow 122 (hereinafter "TFW122") 80%. The remaining 20% of the traffic coming out of web page 120 goes to other web pages not depicted. In the same example, traffic flow 132 from adjacent web page 130 to target web page 140 is 70% of the traffic coming out web page 130, making the weight of traffic flow 132 (hereinafter "TFW132") 70%. The remaining 30% of the traffic coming out of web page 130 goes to other web pages not depicted. As part of step 210, the resource profile of web page 120 is weighted by TFW122 to obtain the resource history value for traffic flow 122, and the resource profile of web page 130 is weighted by TFW132 to obtain the resource history value for traffic flow 132. In this example, there are no additional traffic flows from any web page into target web page 140, and traffic flows out of target web page 140 all flow to adjacent web pages that are not depicted and have a zero value resource profile for the specified resource type.

In one embodiment, weighting a resource profile by a traffic flow weight to obtain a resource history value for the traffic flow is achieved by multiplying the resource profile by the traffic flow weight. In the above example, this results in the resource history value for traffic flow 122 being 80% times the resource profile for web page 120, and the resource history value for traffic flow 132 being 70% times the resource profile for web page 130. The resource history for the traffic flows coming out of target resource 140 (not depicted) are zero, since the adjacent web page resource profiles are zero. In alternate embodiments, weighting can be achieved by other methods that establish a resource history value as a function of a resource profile and associated traffic flow to reflect the likelihood that entities from a web page with an interest in a specified resource type will navigate to a target web page.

In step 220, the resource profile for target web page 140 is established, based on the resource history for the the traffic that accesses target web page 140. In one embodiment, this is accomplished by summing the resource history values from step 210 for the traffic flows between target web page 140 and adjacent web pages. In step 230, based on the resource profile for target web page 140, one or more resources of the specified type are designated to be available via target web page 140. In one embodiment, this designation is made when the resource profile for target web page 140 exceeds a threshold.

In step 240, the designated one or more resources from step 230 are made available via target web page 140. A resource can be any entity that can be identified, named, addressed, accessed, or handled from a computing system. A resource can be any type of addressable object, such as, services, documents, files, advertisements, applications, scripts, or other web resources. In making a resource available via target web page 140, the code for the resource can be placed within target web page 140, so that it's available to an entity navigating to web page 140 without any additional navigation to other web pages. Alternatively, a resource can be made available via target web page 140 via a link, such as a Uniform Resource Locator ("URL"), that directs the entity to the resource. In another embodiment, the resource is a service or content that's made available through script on target web page 140, access to a remote server via web page 140, or a combination of local script and access to a remote server.

Returning to the above example, resources 106 and 116 are resources of a type related to healthy eating options. For example, resource 106 may be a web article related to healthy eating options and resource 116 may be a service that locates restaurants with healthy eating options. Since it's known that web page 100 and web page 110 make resources available with the specified type, their resource profiles are set to a default value. In one embodiment the default value is a weight or score associated with the resource of a specified type being available. An example default value is 100. Using these resource profiles, resource profiles for web pages 120 and 130 can be determined in step 210 to facilitate determining resource history values for traffic flows 122 and 132. These resource history values can be used in step 220 to determine the resource profile for target web page 140.

For purposes of this example, traffic flow 102 has a weight of 40%, traffic flow 104 has a weight of 25%, traffic flow 112 has a weight of 35%, and traffic flow 114 has a weight of 50%. Traffic flows 102, 104, and 112 represent all of the traffic flows associated with web page 120 associated with web pages having a resource related to the healthy eating options type. Traffic flow 114 represents the only traffic flow associated with web page 130 associated with web pages having a resource related to the healthy eating options type. Target web page 140 is not considered in determining resource profile values for web pages 120 and 130, because it does not contain a resource related to the healthy eating options type at this time.

In the above scenario, the resource profile for web page 130 is equal to the resource history value for traffic flow 114. The resource history value for traffic flow 114 is the 100 resource profile of web page 110 weighted by the 50% weight of traffic flow 114. This result is 50 in one embodiment where 100 is multiplied by 50%.

The resource profile for web page 120 is equal to the sum of the resource history values for traffic flows 102, 104, and 112. The resource history value for traffic flow 102 is the 100 resource profile of web page 100 weighted by the 40% weight of traffic flow 102. This result is 40 in one embodiment where 100 is multiplied by 40%. The resource history value for traffic flow 104 is the 100 resource profile of web page 100 weighted by the 25% weight of traffic flow 104. This result is 25 in one embodiment where 100 is multiplied by 25%. The resource history value for traffic flow 112 is the 100 resource profile of web page 110 weighted by the 35% weight of traffic flow 112. This result is 35 in one embodiment where 100 is multiplied by 35%. The resulting resource profile for web page 120 is 100—the sum of the resource history values for traffic flows 102, 104, and 112.

As a result of the above, the resource history value for traffic flows 122 and 132 are 80 and 35, respectively, in an embodiment where a resource history value is determined by multiplying a resource profile by a traffic flow weight. The 100 resource profile of web page 120 weighted by the 80% weight of traffic flow 122 is 80, and the 50 resource profile of web page 130 weighted by the 70% weight of traffic flow 132 is 35. In step 220, the resource profile for target web page 140 is established as 115—the sum of the 80 resource history value for traffic flow 122 and the 35 resource history value for traffic flow 132. In one embodiment, the threshold value used in step 230 is less than 115, so a resource related to the healthy eating options type is designated to be made available via target web page 140, and it is made available in step 240.

In alternate embodiments, the traffic flows used to determine resource history values in step 210 may be limited to those that meet a common set of criteria. For example, traffic flows can be limited to traffic generated at a certain time of day, within a defined set of geographies, or by human based navigation as opposed to software driven navigation caused by malware. In further embodiments, the traffic flows used to determine resource history values in step 210 may be limited to traffic flows extending in a common direction with respect to the web page having the resource profile used to determine the resource history value. In some embodiments, the resource history values used in step 220 to establish a resource profile may be limited to those determined using traffic flows that meet a common set of criteria.

Figure 3:
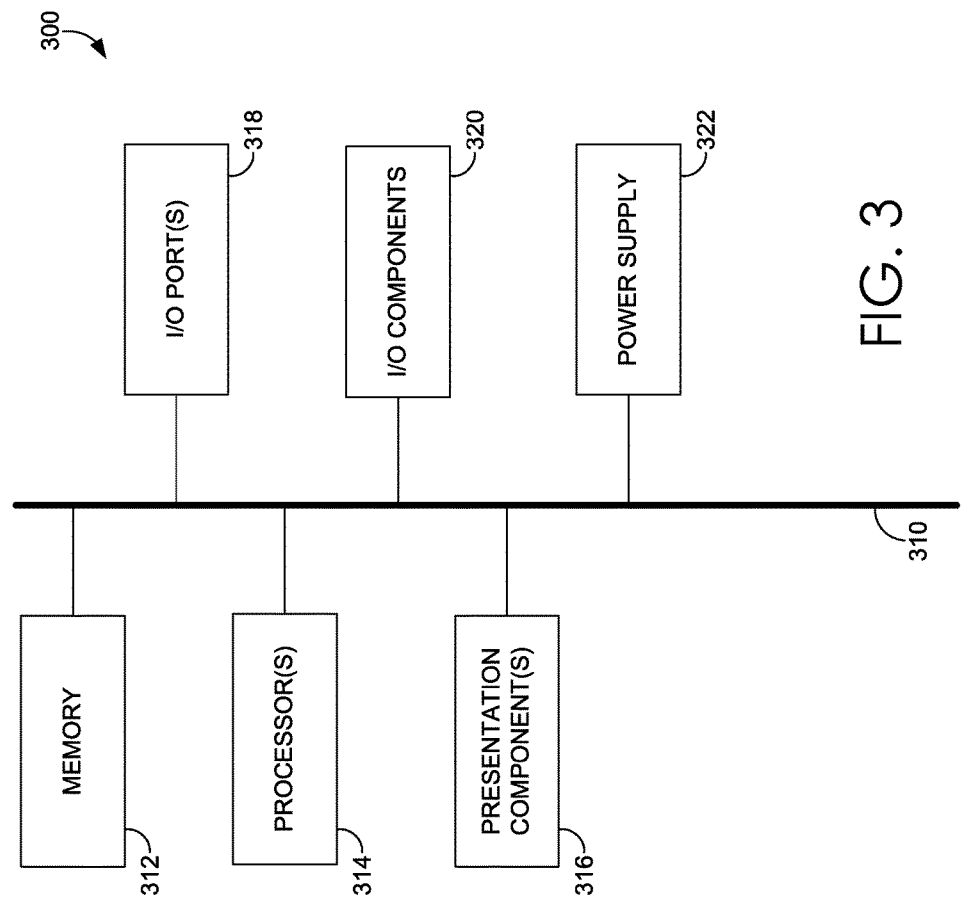
FIG. 3 is a block diagram of an exemplary computing environment suitable for use in implementing embodiments described herein.

Having described exemplary embodiments of the present invention, an exemplary operating environment in which embodiments of the present invention may be implemented is described below in order to provide a general context for various aspects of the present invention. Referring initially to FIG. 3 in particular, an exemplary operating environment for implementing embodiments of the present invention is shown and designated generally as computing system 300. Computing system 300 is but one example of a suitable computing environment and is not intended to suggest any limitation as to the scope of use or functionality of the invention. Neither should computing system 300 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular data types. The invention may be practiced in a variety of system configurations, including general-purpose computers, hand-held devices, consumer electronics, more specialty computing devices, etc. The invention may also be practiced in distributed computing environments where tasks are performed by remote-processing devices that are linked through a communications network.

With reference to FIG. 3, computing system 300 includes bus 310 that directly or indirectly couples the following devices: memory 312, one or more processors 314, one or more presentation components 316, input/output ports 318, input/output components 320, and an illustrative power supply 322. Bus 310 represents what may be one or more busses (such as an address bus, data bus, or combination thereof). Although the various blocks of FIG. 3 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art, and reiterate that the diagram of FIG. 3 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 3 and reference to "computing system."

Computing system 300 typically includes a variety of computer-readable media. Computer-readable media can be any available media that can be accessed by computing device 300 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing system 300. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 312 includes computer storage media in the form of volatile and/or nonvolatile memory. The memory may be removable, non-removable, or a combination thereof. Exemplary hardware devices include solid-state memory, hard drives, optical-disc drives, etc. Computing system 300 includes one or more processors that read data from various entities such as memory 312 or I/O components 320. Presentation component(s) 316 present data indications to a user or other device. Exemplary presentation components include a display device, speaker, printing component, vibrating component, etc.

I/O ports 318 allow computing device 300 to be logically coupled to other devices including I/O components 320, some of which may be built in. Illustrative components include a microphone, joystick, game pad, satellite dish, scanner, printer, wireless device, etc.

Figure 4:
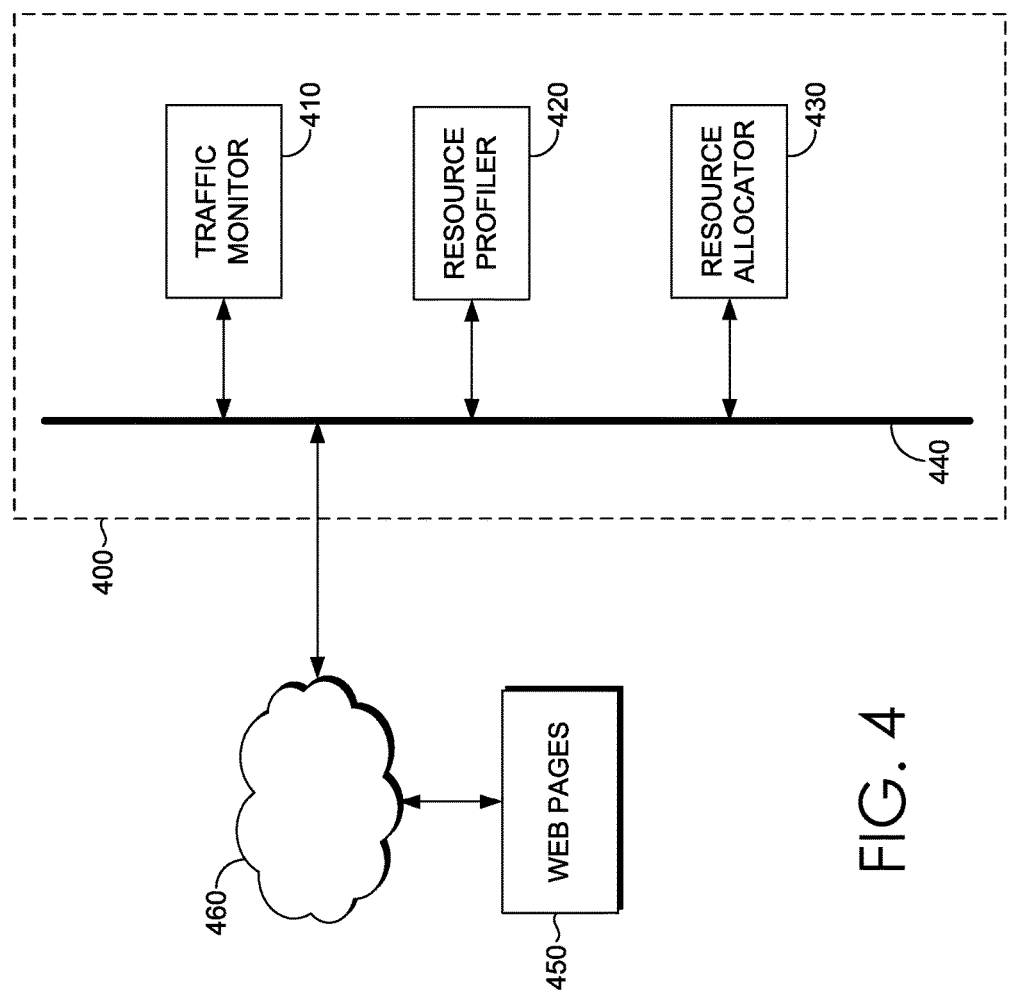
FIG. 4 is block diagram of an exemplary system to implement embodiments described herein.

FIG. 4 illustrates exemplary system 400 in which exemplary implementations of the present invention may be employed. In particular, FIG. 4 shows a high level architecture of system 400 having elements in accordance with implementations of the present disclosure. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein may be implemented as discrete or distributed components or in conjunction with other components, and in any suitable combination and location. Various functions described herein as being performed by one or more entities may be carried out by hardware, firmware, and/or software. For instance, various functions may be carried out by one or more processors, such as processor(s) 314 executing instructions stored in memory, such as memory 312.

In one embodiment, system 400 is used to achieve a computer implementation of the above-described operations used to provide a resource via a target web page, based on the type of resources found on web pages visited by the traffic that also visits the target web page. This includes, but is not limited to, the operations described with reference to FIG. 1 and FIG. 2 above.

System 400 includes traffic monitor 410, resource profiler 420, and resource allocator 430 all connected to system bus 440 to enable communications among themselves. System 400 is configured to communicate with one or more web pages 450, such as pages 100, 110, 120, 130, and 140 shown in FIG. 1. System 400 is coupled to web pages 450 through network 440. In one embodiment, network 440 is the Internet, while in alternate embodiments network 400 may be a private communications network or a combination of private communication networks and the Internet. Network 440 can be one or more networks and may include, without limitation, one or more local area networks (LANs) and/or wide area networks (WANs). In an alternate embodiment, one or more of web pages 450 are hosted on the same computer system that hosts system 400, and the elements of system 400 communicate with such web pages through computer system bus 440.

Traffic monitor 410 carries out the above-described operation for step 210 to determine resource histories. Traffic monitor 410 is implemented in one embodiment through a combination of hardware and software, such as those described for system 300. The software can be implemented as computer-executable instructions in memory 312 that, when executed by one or more processors, such as processors 314, causes the one or more processors to perform operations. In one embodiment, traffic monitor 410 collects information from traffic navigating through web pages 450 to determine weights for traffic flows, such as traffic flows 102, 104, 112, 114, 122, and 132. Traffic monitor 410 determines the origin and destination of a navigation between adjacent web pages, such as navigation between web pages 120 and 140. In one embodiment, the information carried in a communication between the web pages is subject to a communication protocol that provides origin and destination information, and traffic monitor 410 collects this information. One such protocol may be HTTP.

In one embodiment, traffic monitor 410 uses cookies, such as an HTTP cookie, to collect information used to determine weights for traffic flows. In one example of this embodiment, the entity determining resource history values is also responsible for providing content to web pages 450, so the entity can deliver cookies to browsers that load web pages 450. In alternate embodiments, the entity determining resource history values is not responsible for providing content to web pages 450. In one embodiment, traffic monitor 410 maintains information used to determine traffic flow volumes and weights without associating it with personal identity information.

Resource profiler 420 carries out the above-described operations for step 220 to establish resource profiles, and resource allocator 430 carries out the above-described operations for step 230 to designate resources and step 240 to make resources available. Resource profiler 420 and resource allocator 430 are implemented in one embodiment through a combination of hardware and software, such as described with reference to system 300. The software can be implemented as computer-executable instructions in memory 312 that, when executed by one or more processors, such as processors 314, causes the one or more processors to perform operations. Traffic monitor 410, resource profiler 420, and resource allocator 430 use system bus 440 to exchange information to carry out steps 210, 220, 230, and 240, as described above. In one embodiment, system bus 440 is implemented as described for bus 310.

Having described various aspects of system 400, it is noted that any number of components may be employed to achieve the desired functionality within the scope of the present disclosure. Although the various components of FIG. 4 are shown with lines for the sake of clarity, in reality, delineating various components is not so clear, and metaphorically, the lines may more accurately be grey or fuzzy. Further, although some components of FIG. 4 are depicted as single components, the depictions are exemplary in nature and in number and are not to be construed as limiting for all implementations of the present disclosure.

By way of example, system 400 can include an API library that includes specifications for routines, data structures, object classes, and variables may support the interaction of the hardware architecture of system 400 and the software framework of system 400. These APIs include configuration specifications for system 400 such that traffic monitor 410, resource profiler 420, resource allocator 430, and web pages 450 can communicate with each other, as described herein.

In another embodiment described herein, one or more computer storage media has computer-executable instructions embodied thereon that, when executed, by one or more processors, such as processors 320, causes the one or more processors to perform a method to provide a resource via a target web page. The resource is provided based on the type of resources found on web pages visited by the traffic that also visits the target web page. This includes, but is not limited to, the operations described with reference to FIG. 1 and FIG. 2 above, including the operations associated with steps 210, 220, 230, and 240.

For purposes of this disclosure, the word "including" has the same broad meaning as the word "comprising," and the word "accessing" comprises "receiving," "referencing," or "retrieving." In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of the detailed discussion above, embodiments have been described with reference to computing systems and components that support making a resource available via a web page. Components can be configured for performing novel aspects of embodiments, where configured for comprises programmed to perform particular tasks or implement particular data types using code. It is contemplated that the methods described herein can be performed in different types of operating environments having alternate configurations of the functional components described herein. As such, the embodiments described herein are merely exemplary, and it is contemplated that the techniques may be extended to other implementation contexts.

Embodiments presented herein have been described in relation to particular embodiments which are intended in all respects to be illustrative rather than restrictive. Alternative embodiments will become apparent to those of ordinary skill in the art to which the present invention pertains without departing from its scope.

It will be understood that certain features and sub-combinations are of utility and may be employed without reference to other features or sub-combinations. This is contemplated by and is within the scope of the claims.

The invention claimed is:

1. A computer-implemented method comprising:
    establishing a resource profile for a target web page and associated with a specified resource type based on a sum of a plurality of resource history values for at least a portion of a set of traffic flows that accesses the target web page from a plurality of adjacent web pages, wherein the resource profile indicates a likelihood that a user accessing the target web page has previously accessed at least one other web page that makes available a resource corresponding to the specified resource type and a first resource history value of the plurality of resource history values is based on another resource profile for a first adjacent web page of the plurality of adjacent web pages and a first traffic flow of the set of traffic flows that corresponds to the target web page and the first adjacent page; and
    designating at least one of the resource or another resource corresponding to the specified resource type to be available via the target web page based at least in part on the resource profile and transmitting the target web page to one or more users.

2. The method of claim 1, further comprising:
    determining one or more resource history values for a set of traffic flows in the at least a portion of traffic.

3. The method of claim 2, wherein the establishing the resource profile includes:
    summing the resource history values.

4. The method of claim 2, wherein the establishing a resource profile and the determining one or more resource history values is performed without reference to an identity of a person that creates traffic within the at least a portion of traffic.

5. The method of claim 2, wherein:
    each traffic flow in the set of traffic flows extends between the target web page and a respective web page with a respective resource profile, each traffic flow in the set of traffic flows has a weight, and the determining one or more resource history values includes weighting each of the respective resource profiles with a weight for a respective traffic flow in the set of traffic flows.

6. The method of claim 5, wherein the set of traffic flows includes all traffic flows into and out of the target web page in a specified time period.

7. The method of claim 5, wherein the set of traffic flows consists of traffic associated with the target web page that meet a common set of criteria.

8. The method of claim 5, wherein each respective resource profile is associated with the specified resource type that corresponds to the resource.

9. The method of claim 8, wherein the set of traffic flows consists of traffic associated with the target web page in a specific time period that flows between the target web page and any adjacent web page that provides access to any resource that corresponds to the specified resource type.

10. The method of claim 8, wherein the specified resource type is a subject matter designation and at least one of the resource or the other resource is a service for performing an operation related to the subject matter designation.

11. The method of claim 1, further comprising:
making the at least one resource available via the target web page.

12. The method of claim 1, wherein designating at least one of the resource or the other resource includes determining whether the resource profile exceeds a threshold.

13. One or more non-transitory computer storage media having computer-executable instructions embodied thereon that, when executed, by one or more processors, causes the one or more processors to perform a method comprising:
determining one or more resource history values for a set of traffic flows in at least a portion of traffic that accesses a target web page;
establishing a resource profile for the target web page and associated with a specified resource type based on a sum of a plurality of the one or more resource history values, wherein the resource profile indicates a likelihood that a user accessing the target web page has previously accessed at least one other web page that makes available a resource corresponding to the specified resource type and a first resource history value of the plurality of resource history values is based on another resource profile for a first adjacent web page of the plurality of adjacent web pages and a first traffic flow of the set of traffic flows that corresponds to the target page and the first adjacent page; and
designating at least one of the resource or another resource corresponding to the specified resource type to be available via the target web page based at least in part on the resource profile and transmitting the target web page to one or more users,
wherein:
each traffic flow in the set of traffic flows extends between the target web page and a respective web page with a respective resource profile,
each traffic flow in the set of traffic flows has a weight, and
the determining one or more resource history values includes weighting each of the respective resource profiles with a weight for a respective traffic flow in the set of traffic flows.

14. The media of claim 13, wherein the establishing a resource profile and the determining one or more resource history values is performed without reference to an identity of a person that creates traffic within the at least a portion of traffic.

15. The media of claim 13, wherein the set of traffic flows consists of traffic associated with the target web page that meet a common set of criteria.

16. A system comprising:
a processor device; and
a computer-readable storage medium, coupled with the processor device, having instructions stored thereon, which, when executed by the processor device, provide the system with a traffic monitor, a resource profiler, and a resource allocator, wherein
the traffic monitor is configured to determine one or more resource history values for a set of traffic flows in at least a portion of traffic that accesses a target web page;
the resource profiler is configured to establish a resource profile for the target web page and associated with a specified resource type based on a sum of a plurality of the one or more resource history values, wherein the resource profile indicates a likelihood that a user accessing the target web page has previously accessed at least one other web page that makes available a resource corresponding to the specified resource type and a first resource history value of the plurality of resource history values is based on another resource profile for a first adjacent web page of the plurality of adjacent web pages and a first traffic flow of the set of traffic flows that corresponds to the target page and the first adjacent page; and
the resource allocator is configured to designate at least one of the resource or another resource corresponding to the specified resource type to be available via the target web page based at least in part on the resource profile, wherein the target web page is transmitted to one or more users.

17. The system of claim 16, wherein the resource profiler establishes a resource profile and the traffic monitor determines one or more resource history values without reference to an identity of a person that creates traffic within the at least a portion of traffic.

18. The system of claim 16, wherein:
each traffic flow in the set of traffic flows extends between the target web page and a respective web page with a respective resource profile,
each traffic flow in the set of traffic flows has a weight, and
the traffic monitor is further configured to determine the one or more resource history values by weighting each of the respective resource profiles with a weight for a respective traffic flow in the set of traffic flows.

19. The system of claim 18, wherein the set of traffic flows consists of traffic associated with the target web page that meet a common set of criteria.

20. The system of claim 16, wherein the resource allocator is further configured to make at least one of the resource or the other resource available via the target web page.

* * * * *